US012174069B2

(12) United States Patent
Boes et al.

(10) Patent No.: US 12,174,069 B2
(45) Date of Patent: Dec. 24, 2024

(54) MULTICHANNEL SPECTROPHOTOMETER USING LINEAR VARIABLE FILTER SENSOR

(71) Applicant: X-Rite Incorporated, Grand Rapids, MI (US)

(72) Inventors: Chris Boes, Grandville, MI (US); Richard Van Andel, Grand Rapids, MI (US); Rob Kuschinsky, Grand Rapids, MI (US); David Salyer, Grand Rapids, MI (US); Brad Remenak, Grand Rapids, MI (US)

( * ) Notice: Subject to any disclaimer, the term of this patent is extended or adjusted under 35 U.S.C. 154(b) by 130 days.

(21) Appl. No.: 17/922,761

(22) PCT Filed: May 5, 2021

(86) PCT No.: PCT/US2021/030964
§ 371 (c)(1),
(2) Date: Nov. 1, 2022

(87) PCT Pub. No.: WO2021/226284
PCT Pub. Date: Nov. 11, 2021

(65) Prior Publication Data
US 2023/0168123 A1    Jun. 1, 2023

(30) Foreign Application Priority Data

May 5, 2020    (EP) ..................... 20173003

(51) Int. Cl.
*G01J 3/02*    (2006.01)
*G01J 3/51*    (2006.01)
(Continued)

(52) U.S. Cl.
CPC ........... *G01J 3/0294* (2013.01); *G01J 3/0202* (2013.01); *G01J 3/0224* (2013.01); *G01J 3/51* (2013.01); *G01N 21/255* (2013.01); *G02B 13/08* (2013.01)

(58) Field of Classification Search
None
See application file for complete search history.

(56) References Cited

U.S. PATENT DOCUMENTS

| 4,848,904 A | * | 7/1989 | Sapp | G01J 3/42 250/565 |
| 2002/0131047 A1 | * | 9/2002 | Zarrabian | G01J 3/26 356/454 |

(Continued)

FOREIGN PATENT DOCUMENTS

CA    2013733 A1 * 10/1990

OTHER PUBLICATIONS

International Preliminary Report on Patentability regarding PCT/US21/30964, mailed Nov. 17, 2022 (7 pgs.).

(Continued)

*Primary Examiner* — Michelle M Iacoletti
*Assistant Examiner* — Jarreas Underwood
(74) *Attorney, Agent, or Firm* — Hahn Loeser & Parks LLP

(57) ABSTRACT

A multichannel color measurement instrument for measuring spectral properties of a target comprises pick-up optics to collect measurement light, first and second anamorphic optical paths optically coupled to the pick up optics, a pick-up polarizing element located to polarize measurement light in the second anamorphic optical path, a reference anamorphic optical path including a reference illumination source, and a two-dimensional variable filter sensor having an optically transmissive filter function that varies in a first direction parallel to a surface of the variable filter sensor and is substantially constant in a second direction parallel to a surface of the variable filter sensor and orthogonal to the first direction. The anamorphic optical paths spread the measure- (Continued)

ment light in the first direction direct it on to different portions of the variable filter sensor.

14 Claims, 7 Drawing Sheets

(51) Int. Cl.
*G01N 21/25* (2006.01)
*G02B 13/08* (2006.01)

(56) References Cited

U.S. PATENT DOCUMENTS

| | | | |
|---|---|---|---|
| 2003/0058455 A1* | 3/2003 | Ebihara | G01B 11/007 356/612 |
| 2008/0259318 A1* | 10/2008 | Pan | G01J 3/02 356/73 |
| 2012/0250022 A1 | 10/2012 | Zhou et al. | |
| 2024/0230551 A9* | 7/2024 | Urano | G01N 21/93 |

OTHER PUBLICATIONS

International Search Report regarding PCT/US21/30964, mailed Aug. 17, 2021 (4 pgs.).
Written Opinion of the International Searching Authority regarding PCT/US21/30964, mailed Aug. 17, 2021 (11 pgs.).

* cited by examiner

MULTICHANNEL SPECTROPHOTOMETER USING LINEAR VARIABLE FILTER SENSOR

BACKGROUND

A spectrophotometer is a color measurement instrument which measures an intensity of light at a plurality of wavelengths of light. The measurement may be of a reflective sample surface, a transmissive medium, or a combination of the two.

Different spectrophotometer configurations are known. In one example, a spectrophotometer includes a photo-diode as a receiver and one or more sources of illumination. The illumination may comprise white light, and measurements are made through a succession of narrow passband light filters. For example, the filter wavelengths may be evenly spaced between 400 nm and 700 nm with filter passband functions with nominal peaks every 10 nm. In such an example, 31 filters are required. While relatively inexpensive and effective, successively stepping through all 31 filters lengthens acquisition time. Also, resolution is limited by the number of filters included.

In another example, light is received at an instrument during a measurement and is passed through an optical slit and then is directed to a diffraction grating. Light reflecting off the diffraction grating is spread into its constituent wavelengths. This light is directed onto an array of photodiodes, and the intensity of each wavelength is measured. Such a system requires optics to collimate light from the optical slit, a diffraction grating to reflect or transmit quasi-collimated incident light into wavelength dependent angles and a final optical system to reimage the diffracted light onto a linear or two-dimensional photosensitive array. When the dispersed spectral image is formed on a linear array, the device is termed a spectrograph. Devices called imaging spectrometers form the spectral images of the optical slit onto a two-dimensional photo array. The optical requirements for the collimating/imaging systems are more demanding especially for the imaging spectrometer configuration, and thus cost and size often increase. Another drawback of diffraction grating based systems is the low optical throughput as a result of the optical slit blocking most of the light collected from the sample. Low optical throughput can cause long integration times and/or necessitate high levels of measurement illumination, which is disadvantageous for samples which are sensitive to high illumination levels and can degrade under such illumination.

Such diffraction grating instruments often use integrating spheres for the optical measurement geometry. An integrating sphere is an apparatus with an interior cavity (typically spherical) having a highly reflective, optically diffuse white surface. The simplest integrating sphere design contains two apertures, one which admits light and another which serves as a measurement port where the amount of light on the surface of the sphere can be measured. An integrating sphere has the property that at any point on the inner surface of the sphere the illumination is essentially independent of the direction and location of the incident beam as well as the size of the beam; the inner surface is uniformly illuminated throughout, except at the point of direct illumination. Integrating spheres are used in colorimetry for the precise determination of color for a sample under test and in part are known to separate out some surface effects from the perceived color.

A common practice in colorimetry employing integrating sphere illumination is to measure a sample with the specular component of reflection (mirror-like reflection from the surface) either included (SCI mode) or excluded (SCE mode). Other aspects of measurement may include selection of the size of the measured sample surface, spectral content of the illumination, and angle of receiver beam with respect to the sample normal. Instruments designed for colorimetry traditionally measure the sample one configuration at a time (e.g. SCI or SCE mode with a single size of measured area), usually requiring a change of configuration or another instrument to select another mode combination.

When it is desired to measure the SCI and SCE modes simultaneously, multichannel measurement techniques may be employed. Two measurement channels (one for SCI and one for SCE) plus a third channel to spectrally monitor the illumination results in the need for at least three separate channels.

Another common practice in colorimetry is the 45/0 measurement geometry (45° illumination and 0° pick up angle, or equivalently, 0°/45° geometry). Such a measurement geometry measures the spectral reflectance of a sample with the specular component largely excluded by the measurement geometry. 45° illumination can come from one direction, multiple directions (3 directions 120° apart azimuthal (called circumferential illumination), or many directions (annular illumination through ring optics). Other aspects of measurement may include selection of the size of the measured sample surface, size of the illumination spot relative to the pick up size, and angular profile of both incident illumination rays and light received by the pick up system. Certain including special effects samples, clear coated samples, or wet ink on paper, need further reduction of the SCE component, and this is accomplished with the use of polarization filters. The illumination light is polarized such that the electric field component of the incident light is set to be orthogonal to the transmittance axis of a separate polarizer in a measurement channel.

Accordingly, an objective of the present invention is to provide a multi-channel color measurement instrument, capable of making simultaneous or near simultaneous unpolarized and polarized measurements, while avoiding the disadvantages of the prior art.

SUMMARY

A multichannel color measurement instrument for measuring spectral properties of a target comprises pick-up optics comprising at least one lens to collect measurement light, a first anamorphic optical path optically coupled to the pick up optics, a second anamorphic optical path optically coupled to the pick up optics, a pick-up polarizing element located to polarize measurement light in the second anamorphic optical path, a reference anamorphic optical path including a reference illumination source, and a two-dimensional variable filter sensor having an optically transmissive filter function that varies in a first direction parallel to a surface of the variable filter sensor and is substantially constant in a second direction parallel to a surface of the variable filter sensor and orthogonal to the first direction. The first anamorphic optical path is configured such that light is spread in the first direction and is incident on a first measurement portion of the variable filter sensor, the second anamorphic optical path is configured such that light is spread in the first direction and is incident on a second measurement portion of the variable filter sensor, and the reference anamorphic optical path is configured such that reference light is spread in the first direction and incident on a reference portion of the variable filter sensor, the first measurement portion, the second measurement portion and the reference measurement portion being spaced from each other in the second direction.

The filter function varies linearly in the first direction. The filter function may vary in the range of at least 400 nm to 700 nm. The filter function may vary linearly in the range of at least 360 nm to 790 nm. The variable filter sensor may comprise a linearly variable filter bonded to an image sensor.

The multichannel color measurement instrument may further comprise a beam splitter optically coupled to the pick up optics, the beam splitter dividing the measurement light into a first measurement beam and a second measurement beam. The first anamorphic optical path further comprises a first measurement conduit optically coupled to the pick up optics via the first measurement beam produced by the beam splitter. The second anamorphic optical path further comprises a second measurement conduit optically coupled to the pick up optics via the first measurement beam produced by the beam splitter. The first and second measurement conduits each comprise an optically transmissive medium which is shaped to spread the light received from the beam splitter in the first direction.

The pick-up polarizing element may be located between the beam splitter and the second measurement conduit. In another example, the pick-up polarizing element may be bonded to the LVF sensor.

The multichannel color measurement instrument may further comprise an illumination assembly including polarized and unpolarized illumination sources having illumination beams directed to converge at a common measurement area observable by the pick-up optics.

The multichannel color measurement system may further comprise a controller coupled to the illumination assembly and variable filter sensor and configured to operate the illumination assembly and variable filter sensor to make simultaneous measurements including the first measurement portion, the second measurement portion, and the reference portion. Each measurement may include both polarized and unpolarized measurements.

The controller may be further configured to make a measurement by: activating one of the polarized and unpolarized illumination sources; acquiring a first image from the variable filter sensor; activating the other of the polarized and unpolarized illumination sources; and acquiring a second image from the variable filter sensor.

The plurality of unpolarized illumination sources may comprise at least three illumination sources spaced apart from each other in a ring about the aperture and the plurality of polarized illumination sources may comprise at least three illumination sources spaced apart from each other in a ring about the aperture.

The multichannel color measurement instrument may further comprise an anamorphic lens system. The first anamorphic optical path comprising a first optical fiber directing measurement light onto the anamorphic lens system and the second anamorphic optical path comprising a second optical fiber directing light onto the anamorphic lens system. The pick up polarizing element may be bonded to the second measurement portion of the variable filter sensor.

DETAILED DESCRIPTION

Figure 1:
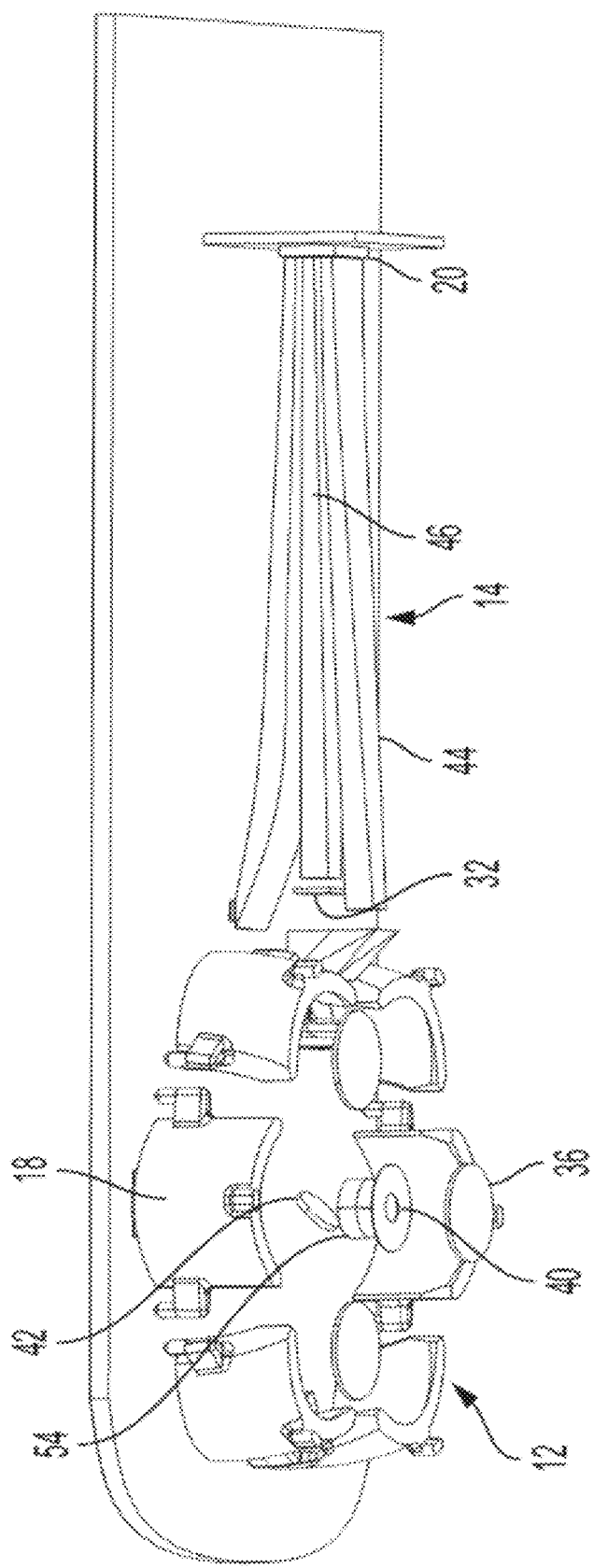
FIG. 1 is a perspective view of an embodiment of the present invention according to a first aspect of the invention.
Figure 2:
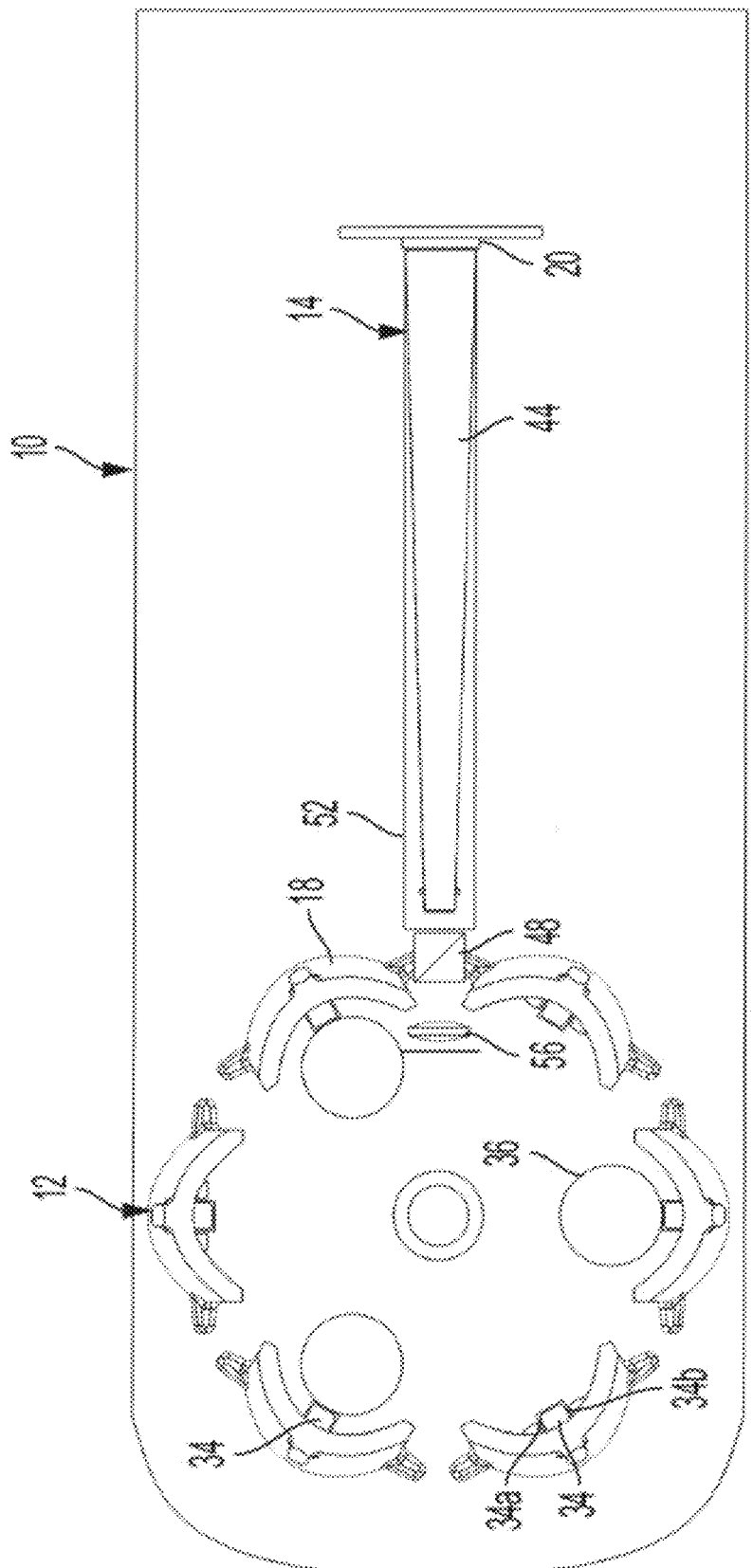
FIG. 2 is a plan view of the embodiment of FIG. 1.
Figure 3:
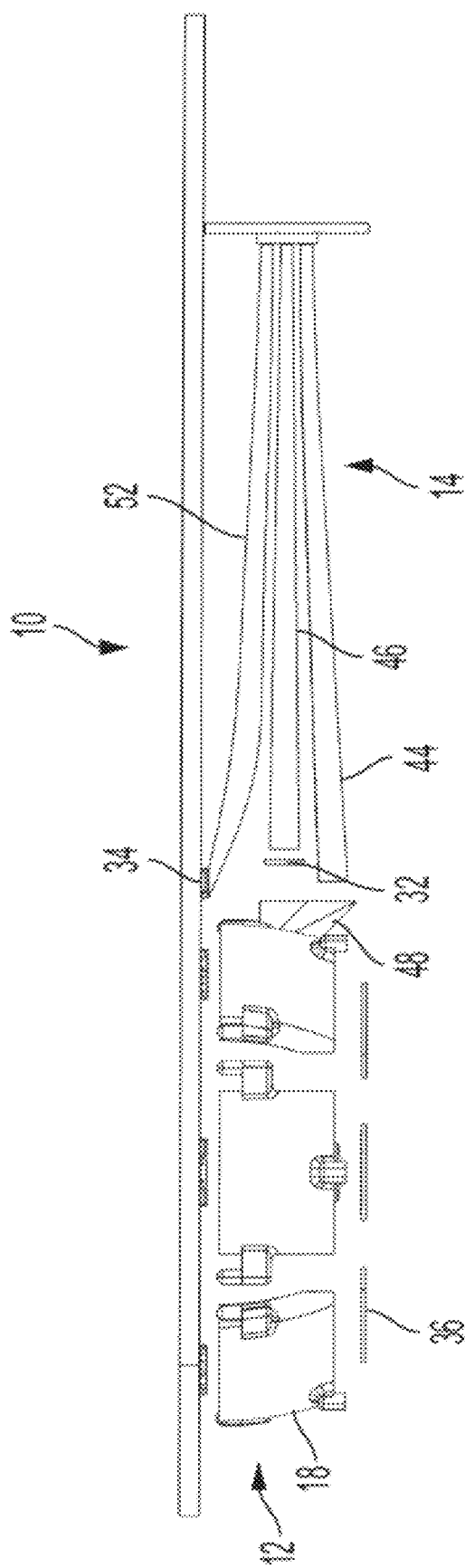
FIG. 3 is a side view of the embodiment of FIG. 1.
Figure 4:
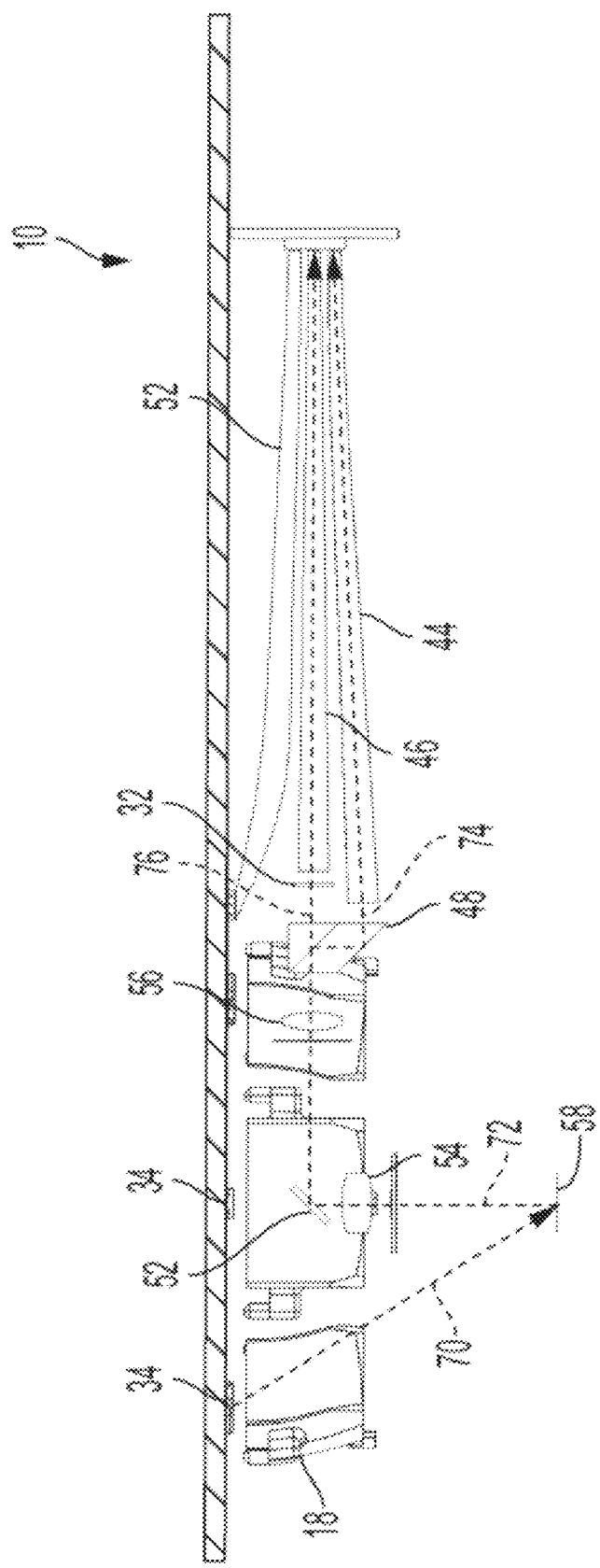
FIG. 4 is a cross-sectional side view of the embodiment of FIG. 1 illustrating illumination and observation paths.

A multichannel color measurement instrument comprising a multichannel spectrophotometer 10 is illustrated in various views in FIGS. 1-4 without a housing or other cover to permit viewing of internal components. The multichannel spectrophotometer 10 according to one aspect of the present invention includes an illumination assembly 12, a multichannel measurement channel 14, and Linear Variable Filter ("LVF") sensor 20. The multichannel measurement channel comprises at least a first anamorphic optical path and a second anamorphic optical path.

The illumination assembly 12 includes at least two illumination sources 18, one polarized and one unpolarized. Each illumination source 18 is separately controllable to sequentially illuminate the sample to make separate measurements with polarized and unpolarized light.

In some embodiments, the polarized illumination sources 18 comprise a broadband LED 34 and an optical source polarizer 36. Light from the LED 34 passes through the source polarizer 36 before illuminating a target, resulting in polarized illumination when activated. The source polarizer may be linearly polarized. In some embodiments, the unpolarized illumination sources 18 comprise a broadband LED 34, an ultraviolet LED 34a, and an infra-red LED 34b. No optical source polarizer 36 is included, resulting in wide spectrum unpolarized illumination when activated.

In some embodiments, the spectrophotometer 10 includes an observation aperture 40 through which light reflected from a target surface passes to observation lens 54. The reflected light is redirected by a mirror 42 to the multichannel measurement channel 14 via lens 56. In some embodiments, the first anamorphic optical path of the multichannel measurement channel 14 comprises a first light conduit 44 and the second anamorphic optical path comprises a second light conduit 46, and a beam splitter 48 is located between the lens 56 and the first light conduit 44 and the second light conduit 46.

In some embodiments, the LVF sensor 20 comprises a two-dimensional image sensor 24 (or other two-dimensional photodiode array) bonded with a linearly variable filter (LVF) 22. Preferably, the image sensor 24 has high sensitivity and is suitable for scientific instrumentation. Examples of suitable image sensors include the KAI-0340 CCD sensor available from ON Semiconductor and IMX426 CMOS image sensor available from SONY. In some embodiments, the image sensor 24 is a monochrome image sensor. In some embodiments, multiple sensors are used, each corresponding to one of the measurement channels of the multichannel measurement channel. In some embodiments, the multiple sensors comprise line sensors.

Figure 5:
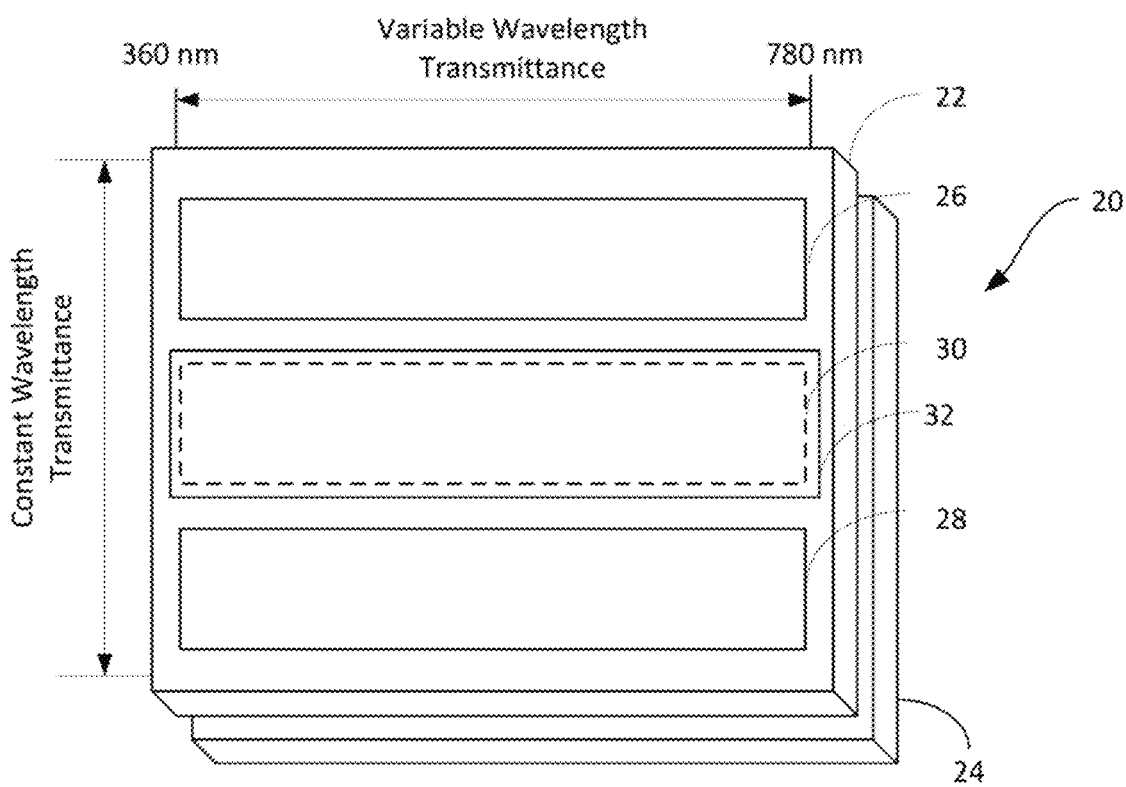
FIG. 5 is an illustration of a LVF Sensor according to another aspect of the present invention.

In some embodiments, the LVF sensor 20 is divided into three portions to support multichannel operation: a reference sensor portion 26, a unpolarized sensor portion 28, and a polarized sensor portion 30. This is illustrated in FIG. 5 with respect to the LVF 22 component of the LVF sensor 20 because that is the component where the unfiltered light is incident and also on FIG. 6 with respect to the image sensor 24 component of the LVF sensor 20 because the portions are determined with respect to pixel locations in the image sensor 24. In the illustrated embodiment, each of the sensor areas has a length and a width, with the length being greater than the width. However, other sensor area geometries, such as square may also be employed. In other embodiments additional measurement or reference channels are be included.

In some embodiments, the LVF 22 comprises an interference type spectral filter with a filter function with transmittance properties varying in one dimension and substantially constant in the other. In one example, the transmittance linearly and progressively changes from 360 nm to 790 nm in a first direction parallel to a surface of the LVF 22. At any given wavelength within that range, transmittance is substantially constant in a second direction also parallel to the surface of the LVF 22, but orthogonal to the first direction. A lengthwise direction of each sensor portion 26, 28, 30, is orientated substantially in the first direction of the LVF 22, i.e., across the progressive change of transmittance of the LVF 22. The sensor portions are separated from each other in the second direction of the LVF 22, i.e., in the direction of substantially constant transmittance.

The illumination assembly 12 directs incident light 70 onto a target 58. Measurement light 72 is reflected from the target 58, through aperture 40 and on to mirror 42. Mirror 42 redirects the measurement light 72 to the beam splitter 48. The beam splitter 48 splits measurement light 72 and transmits a first divided beam of measurement light 74 onto the first end of first light conduit 44 and a second beam of divided measurement light 76 onto the first end of second light conduit 46. Mirror 42 is optional depending on whether a horizontal or vertical measurement channel is desired.

The first and second light conduits 44, 46, each have a first end proximate to the beam splitter 48 and second end proximate to the LVF sensor 20. The second end of the first light conduit 44 is proximate to and directs measurement light upon the unpolarized sensor portion 28. The second end of the second light conduit 46 is proximate to the polarized sensor portion 30. A pick-up polarizer 32 may be mounted near or on the first end of second light conduit 46 (FIG. 1).

A reference light conduit 52 is provided with a first end proximate the illumination assembly 12 and a second end proximate the reference sensor portion 26 of the LVF sensor 20. In some embodiments, the first end to the reference light conduit 52 is illuminated by a broad band LED 34, an ultraviolet LED 34a, and in infrared LED 34b. The target illumination LEDs and the reference LEDs are driven by a common current and voltage so that the light from the reference LEDs is representative of the light from the illumination LEDs.

In some embodiments, each of the measurement light conduits 44, 46 are dimensioned to vary in cross-section from their respective first ends to their respective second ends. In the illustrated example, the light conduits 44, 46 widen in cross section from their respective first ends to their respective second ends to anamorphically spread measurement and reference light beams in the first direction of the LVF Filter 22 to spread each light beam across the filter function of the LVF Filter 22.

It may be understood from this description that, for this embodiment, the unpolarized sensor portion 28, polarized sensor portion 30, and reference sensor portion 26 are not a manufactured feature of the LVF sensor 20, but are the portions of the LVF sensor 20 to which the first light conduit 44, the second light conduit 46, and the reference light conduit 52 direct their respective beams of light.

Figure 6:
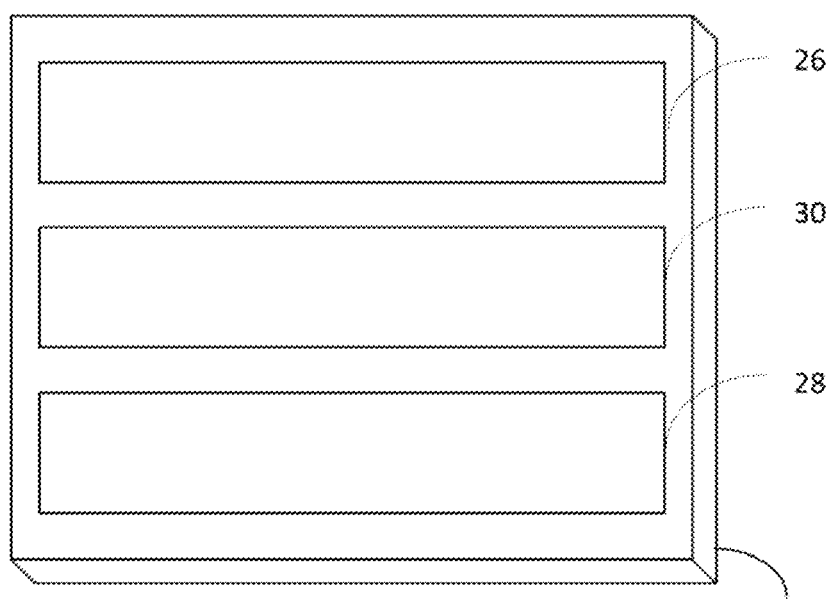
FIG. 6 is an illustration of an image sensor capable of being used with the LVF Sensor of FIG. 5.
Figure 7:
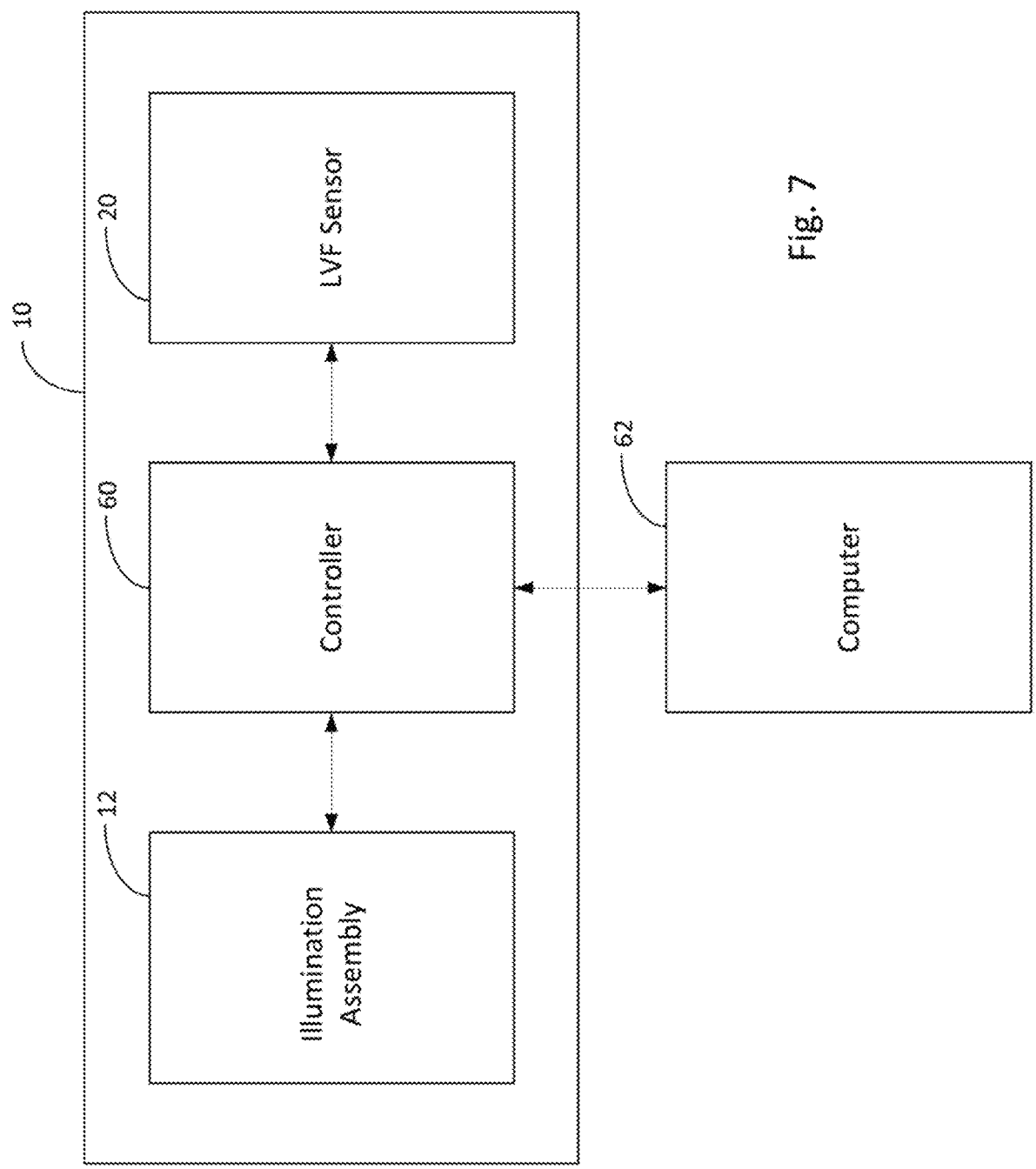
FIG. 7 is an illustration of a block diagram indicating controls and data flows according to another aspect of the invention.
Figure 8:
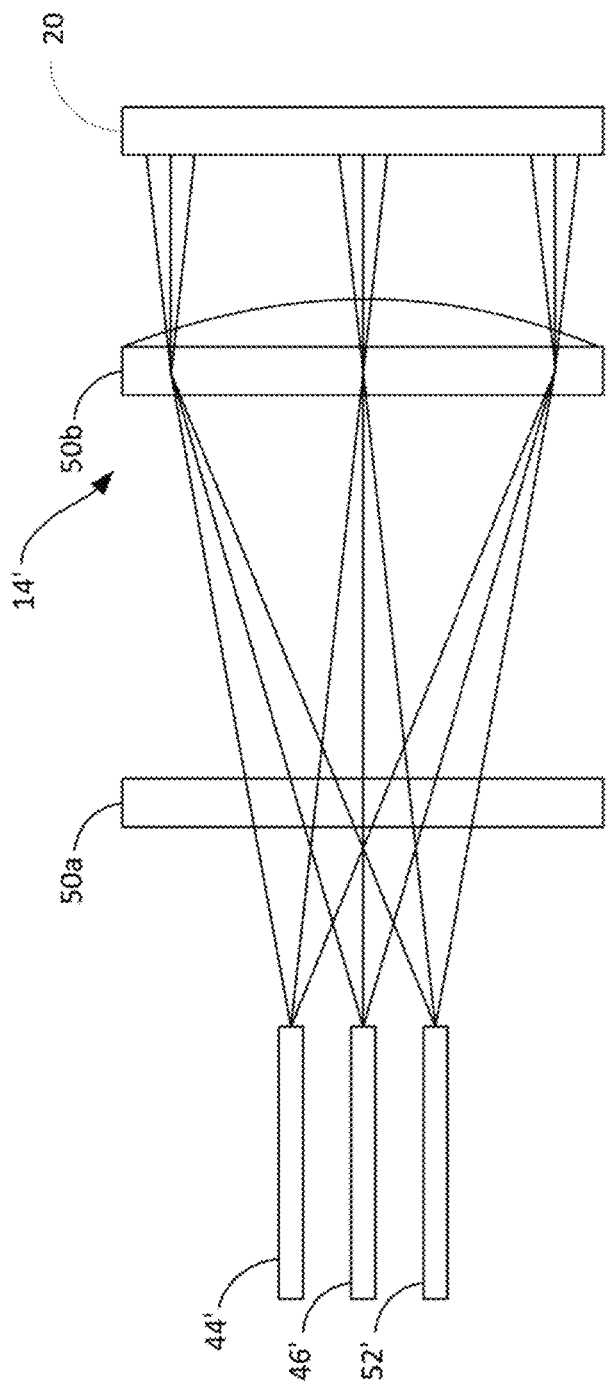
FIG. 8 is an illustration of an fiber optic and anamorphic lens system according to another aspect of the invention.

In some embodiments, certain aspects of the inventive concept may be implemented in a benchtop spectrophotometer having an integrating sphere (not illustrated) including a multichannel measurement channel 14'. Referring to FIG. 8, in such embodiments, the first anamorphic optical path comprises a optical fiber pick up 44' collecting light from an exit aperture of the integrating sphere and directs it onto an anamorphic lens system 50a, 50b. The second anamorphic optical path comprises a second optical fiber pick up 46' collecting light from an exit aperture of the integrating sphere and directing the light onto the same or a separate anamorphic lens system 50a, 50b. A reference optical fiber 52' is also included. Lens 50b of the anamorphic lens system spreads the light from the fiber optic measurement fibers into an oblong or rectangular pattern in a direction corresponding to the filter function. Lens 50a separates the light in a perpendicular direction to land on different portions of the LVF sensor 20. In some embodiments, this rectangular pattern is projected onto the LVF sensor 20 to create a multichannel spectral measurement. In some embodiments, multiple line sensors are used, each corresponding to a measurement path. The anamorphic lens system also separates light from the first and second fibers in a direction perpendicular to the filter function. In such an example, the pick-up polarizer 32 may be mounted on the LVF sensor 20 (FIG. 6). A reference channel may also be included.

In some embodiments, two measurement channels are provided, an unpolarized measurement channel and a polarized measurement channel. In the illustrated example, these are provided by first light conduit 44 and second light conduit 46 in combination with pick-up polarizer 32, respectively. Greater or fewer measurement channels may be employed. The measurement channels are spaced from each other in a direction parallel to the direction of the substantially constant filter function to provide the separate measurement portions on the LVF sensor 20. Light from the unpolarized measurement channel is directed to a first portion of LVF sensor 20 not equipped with polarizer material. The oblong/rectangular pattern of light is orientated such that a lengthwise direction of the pattern aligns with the first direction of the LVF filter, i.e., along the direction of progressively varying transmittance.

In some embodiments, the illumination assembly 12 includes a plurality of LED lamps. In some embodiments, three unpolarized LEDs that produce light from 360-780 nm are provided. The LEDs may comprise a "cocktail" of multiple LEDs whose light when combined provides the desired illumination spectrum. The LEDs are symmetrically spaced in a ring about the aperture at 120° from each other and direct illumination at a common measurement area observable by the pick-up optics on the target 58 at an angle of 45° from a normal of the measurement area of the target 58. The measurement geometry supports both the M0 and M1 conditions as described in ISO 13655. *Graphic technology—Spectral measurement and colorimetric computation for graphic arts image.*

LED cocktails that produce polarized light from 400-780 nm are also included. The LEDs are symmetrically spaced in a ring about the aperture at 120° from each other and direct illumination at a common measurement area observable by the pick-up optics on the target 58 at an angle of 45° from a normal of the measurement area of the target 58. The orientation of the polarization is 90° to the pick-up polarizer 32 placed in the polarized measurement channel of LVF sensor 20. The measurement geometry supports both the M2 and M3 conditions as described in ISO 13655, *Graphic technology—Spectral measurement and colorimetric computation for graphic arts image.*

In some embodiments, a controller 60 is coupled to the illumination assembly 12 and the LVF sensor 20. The controller 60 is configured with instructions stored in non-volatile memory to activate the illumination assembly 12 and acquire measurements from the LVF Sensor as described below. Controller 60 may include a wired or wireless interface to couple the multichannel spectrophotometer 10 to a computer 62.

In some embodiments, wheels are included to facilitate scanning measurements.

The product may be operated in a Spot Mode and a Scan Mode. In the Spot Mode, a user positions the multichannel spectrophotometer 10 over a target to be measured using the targeting system. The targeting system may use both live video and direct view methods. The two sets of illuminators, polarized and unpolarized, can be actuated independently and sequentially for polarized and unpolarized measurements with no moving parts.

The user presses a read button to initiate a measurement with the multichannel spectrophotometer 10. The controller activates the unpolarized LEDs and makes a measurement with unpolarized light, simultaneously capturing light from the reference light conduit 52, first light conduit 44 and second light conduit 46 by acquiring an image including the reference portion 26, unpolarized portion 28 and polarized portion 30 of LVF sensor 20. The multichannel spectrophotometer 10 then activates the polarized LEDs and makes a second measurement with polarized light, simultaneously capturing the reference light conduit 52, first light conduit 44 and second light conduit 46 by capturing a second image including the reference sensor portion 26 unpolarized portion 28 and polarized portion 30 of the LVF sensor 20. Due to fast acquisition rates of the image sensor 24, the sequential measurements are perceived as a single measurement by the user. The sequential measurements may be performed in any order.

In Scan Mode, the user positions the multichannel spectrophotometer 10 in front of a color bar to be measured using the targeting system. The multichannel spectrophotometer 10 may use both video and direct view methods.

The user presses a read button to initiate a scan measurement with the multichannel spectrophotometer 10 or a scan attachment. The multichannel spectrophotometer 10 makes a measurement with unpolarized light taken and captured with reference sensor portion 26 and unpolarized portion of two-dimensional sensor. The multichannel spectrophotometer 10 then measurement with polarized light taken and captured with reference sensor portion and polarized portion of two-dimensional sensor. The multichannel spectrophotometer 10 calculates measurements for all four modes M0, M1, M2, and M3 and stores and/or outputs measurement data. The multichannel spectrophotometer 10 may be in communication with a computer or computer network to facilitate outputting the measurement data.

With the present invention, speed in data acquisition is improved, accuracy is improved, and range of acquisition is larger.

The various embodiments of the invention include the above described embodiments, along with the following embodiments.

A multichannel color measurement instrument for measuring spectral properties of a target comprises an illumination assembly, pick-up optics, a beam splitter, first and second measurement conduits, a reference conduit, a pick-up polarizer, and a two-dimensional variable filter sensor. The illumination assembly includes polarized and/or unpolarized illumination sources directed having illumination beams directed to converge at a common measurement area observable by the pick-up optics. The pick-up optics comprise at least one lens to collect light reflected from the measurement area and direct the measurement light to a beam splitter. The first measurement conduit is optically coupled to a first measurement beam produced by the beam splitter, and the second measurement conduit optically coupled to a second measurement beam produced by the beam splitter. A pick-up polarizer is included to polarize the second measurement beam. The reference conduit includes a reference illumination source. The two-dimensional variable filter sensor has an optically transmissive filter function that varies in a first direction parallel to a surface of the variable filter sensor and is substantially constant in a second direction parallel to a surface of the variable filter sensor and orthogonal to the first direction.

The first optical measurement conduit is configured such that light is spread in the first direction and incident on a first measurement portion of the variable filter sensor, the second optical measurement conduit being configured such that light is spread in the first direction and incident on a second measurement portion of the variable filter sensor, and the reference conduit being configured such that reference light is spread in the first direction and incident on a reference portion of the variable filter sensor, the first measurement portion, the second measurement portion and the reference measurement portion being spaced from each other in the second direction.

The pick-up polarizing element is included in a light path between the second optical measurement conduit and the second measurement portion of the variable filter sensor to polarize the second measurement beam, making the second measurement portion of the variable filter sensor a polarized measurement area. For example, the pick-up polarizing element may be located between the beam splitter and the second measurement conduit, and/or mounted on the first end of the second measurement conduit.

The filter function of the variable filter sensor may vary linearly in the first direction. For example, the filter function may vary in the range of at least 400 nm to 700 nm, for example, in the range of 360 nm to 790 nm. In one example, the variable filter sensor comprises a linearly variable filter bonded to an image sensor.

The first and second measurement conduits may comprise an optically transmissive medium and be shaped to spread the light received form the beam splitter in the first direction. The measurement conduits may comprise spot measurement conduits.

The multichannel color measurement system may further comprise a controller coupled to the illumination assembly and variable filter sensor and configured to operate the illumination assembly and variable filter sensor to make simultaneous measurements including the first measurement portion, the second measurement portion, and the reference portion. Each measurement includes both polarized and unpolarized measurements.

In one example, the controller of the multichannel color measurement system is further configured to make a measurement by: activating one of the polarized and unpolarized illumination sources; acquiring a first image from the variable filter sensor; activating the other of the polarized and unpolarized illumination sources; and acquiring a second image from the variable filter sensor.

In another example, a multichannel color measurement instrument for measuring spectral properties of a target includes pick-up optics, a measurement aperture, an illumination assembly, a reference illumination source, and a two-dimensional variable filter sensor. The measurement aperture admits measurement light to the pick-up optics. The pick-up optics, including at least one lens, collects measurement light and directs it onto a two-dimensional variable filter sensor. The illumination assembly includes a plurality of unpolarized illumination sources and a plurality of polarized illumination sources interspersed with the unpolarized illumination sources, each of the unpolarized illumination sources and polarized illumination sources being directed such that illumination beams emitted by the respective sources converge at a common measurement area that is observable by the measurement aperture and pick-up optics. The reference illumination source includes a reference conduit directing reference illumination on the two-dimensional variable filter sensor. The two-dimensional variable filter sensor has an optically transmissive filter function that varies in a first direction parallel to a surface of the variable filter sensor and is substantially constant in a second direction parallel to a surface of the variable filter sensor and orthogonal to the first direction. The filter function may vary linearly in the first direction.

The plurality of unpolarized illumination sources may comprise at least three illumination sources spaced apart from each other in a ring about the aperture, and the plurality of polarized illumination sources may also comprise at least three illumination sources spaced apart from each other in a ring about the aperture, interspersed with the unpolarized illumination sources.

The multichannel color measurement system may further comprise a controller coupled to the illumination assembly and variable filter sensor and configured to operate the illumination assembly and variable filter sensor to make simultaneous measurements including the first measurement portion, the second measurement portion, and the reference portion.

In one example, the controller of the multichannel color measurement system is further configured to make a measurement by: activating one of the polarized and unpolarized illumination sources; acquiring a first image from the variable filter sensor; activating the other of the polarized and unpolarized illumination sources; and acquiring a second image from the variable filter sensor.

The disclosures herein are not necessarily limited spectrophotometers as such, and may more broadly be applied to color measurement instruments in general. In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A multichannel color measurement instrument for measuring spectral properties of a target, comprising:
    pick-up optics comprising at least one lens to collect measurement light;
    a first anamorphic optical path optically coupled to the pick up optics;
    a second anamorphic optical path optically coupled to the pick up optics;
    a pick-up polarizing element located to polarize measurement light in the second anamorphic optical path;
    a reference anamorphic optical path including a reference illumination source; and
    a two-dimensional variable filter sensor having an optically transmissive filter function that varies in a first direction parallel to a surface of the variable filter sensor and is substantially constant in a second direction parallel to a surface of the variable filter sensor and orthogonal to the first direction;
    the first anamorphic optical path being configured such that light is spread in the first direction and is incident on a first measurement portion of the variable filter sensor, the second anamorphic optical path being configured such that light is spread in the first direction and is incident on a second measurement portion of the variable filter sensor, and the reference anamorphic optical path being configured such that reference light is spread in the first direction and incident on a reference portion of the variable filter sensor, the first measurement portion, the second measurement portion and the reference measurement portion being spaced from each other in the second direction.

2. The multichannel color measurement instrument of claim 1, wherein the filter function varies linearly in the first direction.

3. The multichannel color measurement instrument of claim 1, wherein the filter function varies in the range of at least 400 nm to 700 nm.

4. The multichannel color measurement instrument of claim 1, wherein the filter function varies linearly in the range of at least 360 nm to 790 nm.

5. The multichannel color measurement instrument of claim 1, further comprising a beam splitter optically coupled to the pick up optics, the beam splitter dividing the measurement light into a first measurement beam and a second measurement beam;
    wherein the first anamorphic optical path further comprises a first measurement conduit optically coupled to the pick up optics via the first measurement beam produced by the beam splitter;
    wherein the second anamorphic optical path further comprises a second measurement conduit optically coupled to the pick up optics via the first measurement beam produced by the beam splitter; and
    wherein first and second measurement conduits each comprise an optically transmissive medium which is shaped to spread the light received from the beam splitter in the first direction.

6. The multichannel color measurement instrument of claim 5, wherein the pick-up polarizing element is located between the beam splitter and the second measurement conduit.

7. The multichannel color measurement system of claim 1, wherein the variable filter sensor comprises a linearly variable filter bonded to an image sensor.

8. The multichannel color measurement system of claim 7, wherein the plurality of unpolarized illumination sources comprises at least three illumination sources spaced apart from each other in a ring about the aperture; and
   wherein the plurality of polarized illumination sources comprise at least three illumination sources spaced apart from each other in a ring about the aperture.

9. The multichannel color measurement instrument of claim 1, further comprising an illumination assembly including polarized and unpolarized illumination sources having illumination beams directed to converge at a common measurement area observable by the pick-up optics.

10. The multichannel color measurement system of claim 9, further comprising a controller coupled to the illumination assembly and variable filter sensor and configured to operate the illumination assembly and variable filter sensor to make simultaneous measurements including the first measurement portion, the second measurement portion, and the reference portion.

11. The multichannel color measurement system of claim 10, wherein each measurement includes both polarized and unpolarized measurements.

12. The multichannel color measurement system of claim 10, wherein the controller is further configured to make a measurement by:
   activating one of the polarized and unpolarized illumination sources;
   acquiring a first image from the variable filter sensor;
   activating the other of the polarized and unpolarized illumination sources; and
   acquiring a second image from the variable filter sensor.

13. The multichannel color measurement instrument of claim 1, further comprising an anamorphic lens system;
   the first anamorphic optical path comprising a first optical fiber directing measurement light onto the anamorphic lens system; and
   the second anamorphic optical path comprising a second optical fiber directing light onto the anamorphic lens system.

14. The multichannel measurement instrument of claim 13, wherein the pick up polarizing element is bonded to the second measurement portion of the variable filter sensor.

* * * * *